US010082858B2

(12) United States Patent
Burstein et al.

(10) Patent No.: US 10,082,858 B2
(45) Date of Patent: Sep. 25, 2018

(54) PERIPHERAL DEVICE ASSISTANCE IN REDUCING CPU POWER CONSUMPTION

(71) Applicant: MELLANOX TECHNOLOGIES LTD., Yokneam (IL)

(72) Inventors: Idan Burstein, Karmiel (IL); Shlomo Raikin, Moshav Ofer (IL); Noam Bloch, Bat Shlomo (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 14/745,549

(22) Filed: Jun. 22, 2015

(65) Prior Publication Data

US 2015/0370309 A1    Dec. 24, 2015

Related U.S. Application Data

(60) Provisional application No. 62/015,553, filed on Jun. 23, 2014.

(51) Int. Cl.
*G06F 1/00* (2006.01)
*G06F 1/32* (2006.01)

(52) U.S. Cl.
CPC .................. *G06F 1/3209* (2013.01)

(58) Field of Classification Search
CPC ...................................... G06F 1/3209
USPC .......................................... 713/323
See application file for complete search history.

(56) References Cited

U.S. PATENT DOCUMENTS

| 7,272,741 | B2 | 9/2007 | Wilcox et al. | |
|---|---|---|---|---|
| 8,010,822 | B2* | 8/2011 | Marshall | G06F 1/3203 |
| | | | | 713/323 |
| 8,566,628 | B2 | 10/2013 | Branover et al. | |
| 8,949,498 | B2 | 2/2015 | Kagan | |
| 9,154,312 | B2 | 10/2015 | Katar et al. | |
| 9,374,190 | B2 | 6/2016 | Koskela et al. | |
| 2003/0110012 | A1* | 6/2003 | Orenstien | G06F 1/206 |
| | | | | 702/188 |
| 2007/0238437 | A1 | 10/2007 | Jaakkola | |
| 2007/0245164 | A1* | 10/2007 | Mitarai | G06F 1/3203 |
| | | | | 713/320 |
| 2009/0299506 | A1 | 12/2009 | Lydon et al. | |
| 2010/0131781 | A1* | 5/2010 | Memon | G06F 1/3209 |
| | | | | 713/310 |
| 2010/0332869 | A1* | 12/2010 | Hsin | G06F 1/3203 |
| | | | | 713/320 |
| 2011/0289357 | A1 | 11/2011 | Shina | |
| 2012/0117403 | A1* | 5/2012 | Bieswanger | G06F 1/3206 |
| | | | | 713/322 |

(Continued)

OTHER PUBLICATIONS

Hewlett-Packard Corporation et al., "Advanced Configuration and Power Interface Specification", Version 5.0 Errata A, 956 pages, Nov. 13, 2013.

(Continued)

*Primary Examiner* — Nitin Patel
(74) *Attorney, Agent, or Firm* — D. Kligler IP Services Ltd.

(57) ABSTRACT

A method for processing data includes receiving in a peripheral device, which is connected by a bus to a host processor having multiple host resources, information regarding respective power states of the host resources. The data are selectively directed from the peripheral device to the host resources responsively to the respective power states.

28 Claims, 3 Drawing Sheets

(56) References Cited

U.S. PATENT DOCUMENTS

| | | |
|---|---|---|
| 2012/0213118 A1* | 8/2012 | Lindsay .................. H04L 12/12 |
| | | 370/254 |
| 2012/0324258 A1 | 12/2012 | Branover et al. |
| 2013/0250853 A1 | 9/2013 | Eravelli et al. |
| 2014/0013057 A1 | 1/2014 | Agrawal et al. |
| 2014/0153568 A1* | 6/2014 | Gasparakis ........... H04L 5/0058 |
| | | 370/389 |
| 2014/0181228 A1 | 6/2014 | Cho |
| 2014/0181352 A1 | 6/2014 | Conrad et al. |
| 2014/0201411 A1* | 7/2014 | Kumar .................... G06F 13/24 |
| | | 710/262 |
| 2014/0237278 A1* | 8/2014 | Kumar .................. G06F 1/3206 |
| | | 713/323 |
| 2014/0281639 A1 | 9/2014 | Wagh et al. |
| 2014/0304538 A1 | 10/2014 | Chen et al. |
| 2014/0362707 A1 | 12/2014 | Frederiksen et al. |
| 2015/0138988 A1 | 5/2015 | Shaw |
| 2015/0208029 A1 | 7/2015 | Gluskin |
| 2015/0271176 A1 | 9/2015 | Wei |
| 2015/0378945 A1 | 12/2015 | Bradbury et al. |
| 2016/0380898 A1 | 12/2016 | Englund et al. |

OTHER PUBLICATIONS

PCI Express® Base Specification, Revision 3.1 , 1073 pages, Mar. 2014.
InfiniBand Trade Association, "InfiniBandTM Architecture Specification vol. 1", Release 1.2.1, Nov. 2007.
Burstein et al, U.S. Appl. No. 14/836,988, filed Aug. 27, 2015.
U.S. Appl. No. 14/836,988 Office Action dated Dec. 30, 2016.
U.S. Appl. No. 14/836,988 Office Action dated Jul. 10, 2017.
U.S. Appl. No. 14/836,988 Office Action dated Nov. 22, 2017.
U.S. Appl. No. 14/836,988 Office Action dated Jul. 20, 2018.

* cited by examiner

PERIPHERAL DEVICE ASSISTANCE IN REDUCING CPU POWER CONSUMPTION

CROSS-REFERENCE TO RELATED APPLICATIONS

This application claims the benefit of U.S. Provisional Patent Application 62/015,553, filed Jun. 23, 2014, which is incorporated herein by reference.

FIELD OF THE INVENTION

The present invention relates generally to computer systems, and particularly to methods and devices for power management in such systems.

BACKGROUND

Large-scale and high-power computer systems consume great amounts of electrical power, and reducing this power consumption has become a key concern in system design. Various architectural features and interfaces have been developed to facilitate control and reduction of power consumption.

For example, the Advanced Configuration and Power Interface (ACPI) Specification (November, 2013) was developed by leading companies in the computer industry in order to establish common interfaces enabling robust operating system (OS)-directed motherboard device configuration and power management of both devices and entire systems. The ACPI Specification defines both global power states of the computer and specific power states of components, such as the processor (generally referred to as the central processing unit, or CPU). The processor states are referred to as C0, C1, C2, . . . , Cn, wherein C0 is an active power state in which the CPU executes instructions, and C1 through Cn refer to different sleeping states (also referred to as sleep levels), with progressively lower levels of power consumption and correspondingly greater exit latencies. To conserve power, the OS places the processor into one of the supported sleeping states when the processor is idle. To regulate power consumption of active processors in the C0 state, the ACPI Specification also defines means for processor clock throttling and different processor performance states P0, P1, . . . Pn.

The PCI Express® Base Specification (Revision 3.1, March, 2014) defines mechanisms that can be used on the PCI Express (PCIe) bus to coordinate power management with Endpoints on the bus. For example, section 6.18 of the specification describes a Latency Tolerance Reporting (LTR) mechanism, which enables Endpoints to report their service latency requirements for Memory Reads and Writes to the Root Complex, so that power management policies for central platform resources can be implemented to consider Endpoint service requirements. (The Root Complex is not required to honor the requested service latencies, but is strongly encouraged to do so.)

As another example, section 6.19 in the PCIe specification describes an Optimized Buffer Flush/Fill (OBFF) Mechanism, which enables a Root Complex to report to Endpoints time windows when the incremental platform power cost for Endpoint bus mastering and/or interrupt activity is relatively low. Typically these windows correspond to times during which the host CPU(s), memory, and other central resources associated with the Root Complex are active to service some other activity, for example the operating system timer tick. An OBFF indication is a hint—Functions are still permitted to initiate bus mastering and/or interrupt traffic whenever enabled to do so, although this activity will not be optimal for platform power, and the specification suggests that it should be avoided.

A number of techniques have been described in the patent literature for power management involving input/output (I/O) components. For example, U.S. Patent Application Publication 2012/0324258 describes a method of regulating power states in a processing system in which a processor component reports a present processor power state to an input-output hub. The present processor power state corresponds to one of a plurality of different processor power states ranging from an active state to an inactive state. The input-output hub receives data indicative of the present processor power state and establishes a lowest allowable hub power state that corresponds to one of a plurality of different hub power states ranging from an active state to an inactive state.

SUMMARY

Embodiments of the present invention that are described hereinbelow provide techniques that can be implemented by peripheral devices to assist in reducing CPU power consumption, as well as devices implementing such techniques.

There is therefore provided, in accordance with an embodiment of the invention, a method for processing data, which includes receiving in a peripheral device, which is connected by a bus to a host processor having multiple host resources, information regarding respective power states of the host resources. The data are selectively directed from the peripheral device to the host resources responsively to the respective power states.

Typically, the multiple host resources include multiple processing cores, and selectively directing the data includes choosing, in the peripheral device, a core for direction of an item of the data thereto from the peripheral device based on the respective power states of the cores. In some embodiments, the information identifies one or more first cores that are in an active state, while one or more second cores are in a sleep state, and choosing the core includes preferentially selecting one of the first cores and directing the item of the data to the selected one of the first cores.

In a disclosed embodiment, the information is indicative of respective measures of utilization of the first cores, and choosing the core includes selecting one of the first cores having a respective measure of utilization that is below a predefined threshold for direction of the item of the data thereto, and selecting one of the second cores for direction of the item of the data thereto when the respective measures of utilization of all of the first cores are above the predefined threshold. Additionally or alternatively, the information is indicative of a service level provided by the first cores.

Further additionally or alternatively, the information is indicative of different, respective sleep levels of the second cores, and choosing the core includes, when not selecting one of the first cores, selecting one of the second cores for direction of the item of the data thereto responsively to the respective sleep levels.

Still further additionally or alternatively, the information is indicative of respective clock frequencies of one or more of the processing cores, and choosing the core includes selecting the core for direction of the item of the data thereto responsively to the clock frequencies.

In some embodiments, selectively directing the data includes choosing a core for direction of an item of the data thereto from the peripheral device, and moderating issuance of an interrupt to inform the chosen core of delivery of the item of the data based on a respective power state of the chosen core. Additionally or alternatively, selectively directing the data includes selectively buffering a portion of the data responsively to the respective power states of the host resources to which the data are directed.

In a disclosed embodiment, the peripheral device includes a network interface controller (NIC), and selectively directing the data includes receiving in the NIC data packets from a network, and choosing the host resources to be applied in handling the data packets responsively to the respective power states.

In some embodiments, receiving the information includes receiving, in the peripheral device, steering instructions provided by software running on the host processor based on the power states of the host resources.

There is also provided, in accordance with an embodiment of the invention, apparatus for processing data, including a host interface, which is configured to be connected by a bus to a host processor having multiple host resources, and a network interface, which is configured to transmit and receive data over a network. Packet processing circuitry, coupled between the host interface and the network interface, is configured to receive, from the host processor, information regarding respective power states of the host resources, and to selectively direct the data from the network to the host resources responsively to the respective power states.

There is additionally provided, in accordance with an embodiment of the invention, a computing system, which includes host resources, including at least a host processor, which includes multiple processing cores, and a memory, and a bus coupled to the host resources. A peripheral device is coupled to the bus and is configured to receive, from the host processor, information regarding respective power states of the host resources, and to selectively direct data to the host resources responsively to the respective power states.

The present invention will be more fully understood from the following detailed description of the embodiments thereof, taken together with the drawings in which:

DETAILED DESCRIPTION OF EMBODIMENTS

Figure 1:
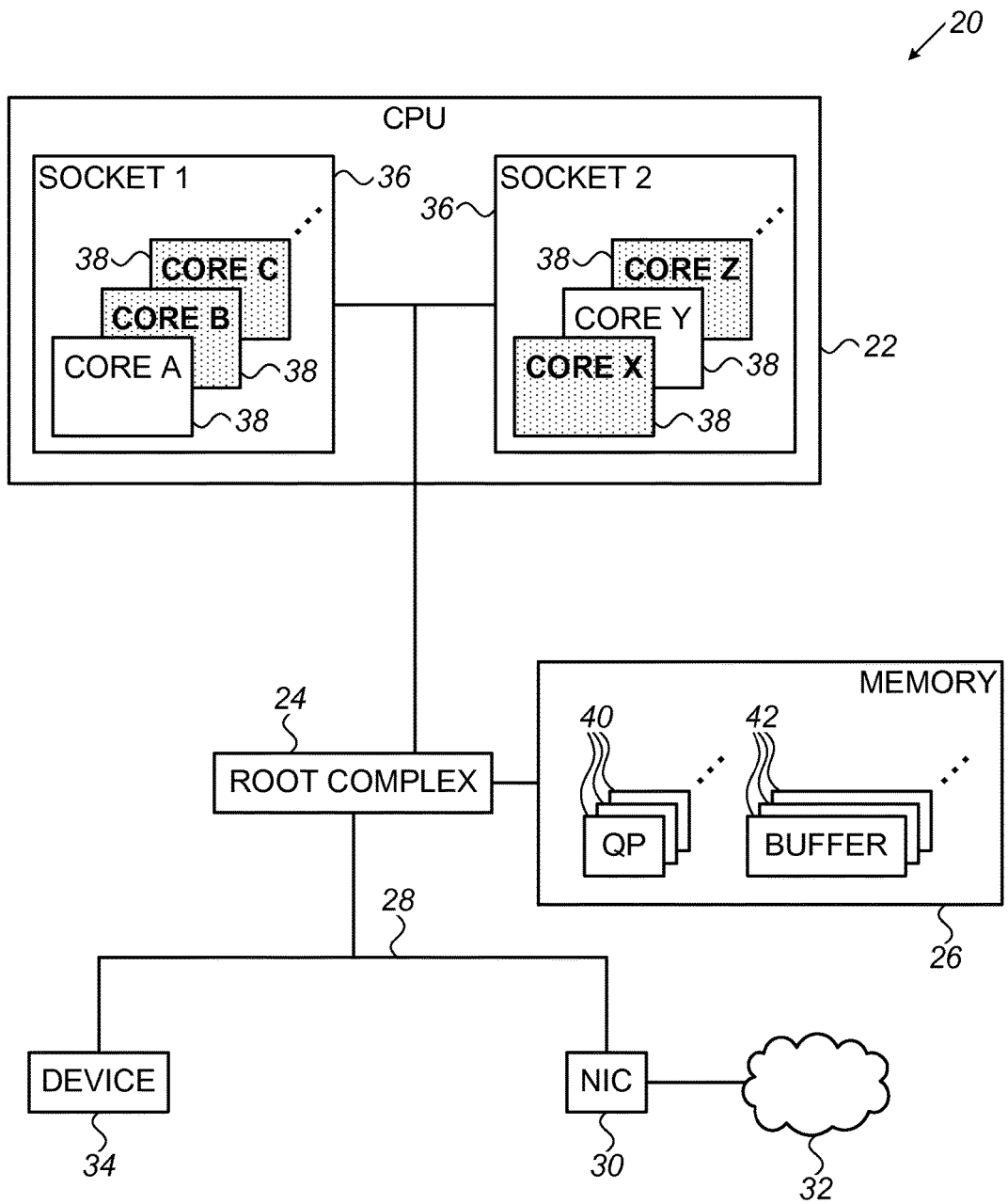
FIG. 1 is block diagram that schematically illustrates a computer system, in accordance with an embodiment of the invention.

In current-generation server architectures, the CPU typically comprises many processing cores (for example, thirty-two cores), and the OS is capable of controlling the power state of each core individually according to current operating requirements. Peripheral devices, however, such as a network interface controller (NIC) serving the CPU, receive coarse-grained information, at best, regarding the power state of the CPU.

Thus, for example, the NIC will typically spread the load of handling incoming communication traffic equally among the cores, using techniques that are known in the art such as receive-side scaling (RSS), regardless of the individual power states of the cores. Consequently, when the NIC has an incoming packet to deliver to a given core, it will send an interrupt to the core regardless of the core power state, so that cores in low-power sleep states will necessarily be awakened. In such a case, not only will the CPU power consumption be increased by activation of the sleeping core, but latency in handling of and responding to the incoming packet will be increased, as well, while waiting for the core in question to wake up. This increased latency may eventually lead to packets being dropped when the core fails to serve the receive queue with new available buffers.

Embodiments of the present invention that are described herein can be useful in alleviating these problems, and thus reducing system power consumption, by providing peripheral components, such as a NIC, with fine-grained information regarding the power states of host resources. This information may take the form of explicit declarations of the power states of the resources. Alternatively or additionally, driver software running on the CPU may provide the power state information to the peripheral components in the form of packet and interrupt steering instructions, wherein these instructions are derived from and updated according to the power states of the host resources. The "resources" in question typically include the individual cores of the CPU, and may also include other host components such as the memory and root complex. The peripheral components are able to use this information in selectively directing data and interrupts to those resources that are in active power states, thus enabling sleeping resources to remain asleep for as long as possible. Additionally or alternatively, when data and/or interrupts must be sent to a core that is currently sleeping, the peripheral device may choose to buffer the data and/or moderate (hold off) the interrupts selectively for that core, in order to optimize the balance between maximizing sleep time and minimizing processing latency.

The disclosed embodiments relate to a peripheral device, which is connected by a bus, such as a PCIe bus, to a host processor that includes multiple host resources. These host resources typically include multiple processing cores, as well as ancillary resources of the processor, such as the host memory and root complex. The peripheral device receives information regarding respective power states of the host resources, and selectively directs data to the host resources responsively to the respective power states of the resources. As noted above, the "information" may comprise raw indications of the actual power states of host resources or, additionally or alternatively, data and interrupt steering instructions that are provided by driver software to the peripheral device on the basis of the actual power states. In the example embodiments that are described below, the peripheral device comprises a NIC, which uses the information regarding power states in selecting the host resources to handle incoming data packets, but the principles of the present invention may similarly be applied, mutatis mutandis, to other sorts of I/O devices, as well as to accelerators and other interface components that communicate with the host processor over a bus.

In some embodiments, the host processor comprises multiple processing cores, and the peripheral device uses the power state information in choosing a core for direction of an item of data (such as an incoming data packet) thereto. Typically, the power state information includes an identification of which cores are in an active state, and which are in a sleep state. When possible, the peripheral device preferentially selects one of the active cores to receive the data item.

In addition, in some of these embodiments, the power state information includes respective measures of utilization of the active cores. The peripheral device uses this information in loading work onto the active cores until their respective measures of utilization reach a certain, predefined threshold, thus maximizing the utilization of the active cores and keeping as many cores as possible in sleep states. When all of the active cores have passed their utilization thresholds, the peripheral device awakens one of the sleeping cores to handle new data items. When a core is no longer utilized, it drops back to a sleep state. Additionally or alternatively, the power state information is indicative of a service level provided by the cores, for example, message rate or latency.

Additionally or alternatively, the power state information may include indications of the respective sleep levels of the sleeping cores. In this case, when the peripheral device must choose a sleeping core to awaken, it chooses the core based on the sleep levels. Typically, the peripheral device will choose a core in a relative "shallow" sleep state, such as C1, in order to reduce the latency of response to the data item and maintain the lowest possible overall power consumption.

Further additionally or alternatively, the power state information may comprise an indication of the respective clock frequencies of the active processing cores, and the peripheral device chooses the core to which the data item will be transmitted based on the clock frequencies. Typically, the objective in this case will be to fully load the cores that are operating at high frequency, while reducing the clock frequencies, and thus the power consumption, of the active cores insofar as possible.

In some embodiments, the peripheral device uses the power state information in controlling the manner in which the host resources are used, in addition to or instead of the selection of the host resources to use for each data item. For example, upon choosing to deliver a given data item to a core that is currently in a sleep state, the peripheral device can moderate the issuance of an interrupt to inform the chosen core of delivery of the item. Additionally or alternatively, the peripheral device can selectively buffer a portion of the data that is directed to host resources that are currently in a low-power state. This sort of selective interrupt moderation and/or data buffering is advantageous in balancing power consumption and latency requirements when dealing with resources operating in reduced-power states, while permitting active resources to be used at full speed, without unneeded interrupt moderation or data buffering.

FIG. 1 is a block diagram that schematically illustrates a computer system 20, in accordance with an embodiment of the invention. System 20 comprises host resources, including a CPU 22, as well as a root complex 24 and a host memory 26, which are typically interconnected by internal host buses. (Although root complex 24 is shown in the figure as a separate component from CPU 22, in some implementations the root complex functionality is integrated into the CPU.) The host resources are connected by a peripheral interface bus 28, such as a PCIe bus, to peripheral components, such as a NIC 30 and other peripheral devices 34. NIC 30 connects system 20 to a packet network 32, such as an Ethernet or InfiniBand switch fabric.

As in common server architectures, CPU 22 comprises multiple sockets 36 in the host motherboard, each of which accommodates multiple cores 38. Typically, at any given time, some of cores 38 are active, while others are in various sleep states, as described above. (Alternatively, at times of high load, all of the cores may be active.) For example, in the pictured example, cores A and Y are active, while cores B, C, X and Z are in sleep states, as indicated by the shading in the figure. As explained above, the sleeping cores may be in different power states (from C1 to Cn, in accordance with ACPI notation), and the active cores may have different clock frequencies or may otherwise be in different performance states, depending on their levels of utilization. The other host resources, such as root complex 24 and memory 26, may similarly have multiple different power states.

A power management component of system 20, such as an OS power management process running on CPU 22 or a dedicated hardware component, tracks and controls the power states of cores 38 and other host resources and passes information regarding the respective power states of the host resources to NIC 30 and other peripheral devices 34. As noted earlier, this power state information typically includes indications of the activity and sleep states of each of cores 38 and other resources. Additionally or alternatively, as noted earlier, the power state information that is reported to NIC 30 and other peripheral devices 34 may include information regarding utilization levels, performance states and/or clock frequencies of each of the active cores.

The power management component that is associated with CPU 22 may pass this power state information to NIC 30 and other peripheral devices 34 in various forms (including "raw" information and/or steering instructions) and via various channels. For example, in some embodiments, the power management component passes the information in the form of in-band messages, such as dedicated PCIe packets, over bus 28. The OBFF mechanism described above in the Background section may be extended to support this sort of fine-grained power state reporting. In other embodiments, a dedicated hardware channel on bus 28 (or separate from bus 28) may be provided for transmission of power state information.

Inter-process communications between system 20 and other computers over network 32 use multiple transport service instances, referred to herein as queue pairs (QPs) 40, in accordance with InfiniBand convention. (Alternatively, in Ethernet parlance, transport service instances may be referred to as rings.) Typically, the context for each QP 40 is held in memory 26, where it can be accessed by NIC 30 and by software running on CPU 22. NIC 30 and software processes running on CPU 22 exchange data by writing to and reading from buffers 42 in memory 26.

Figure 2:
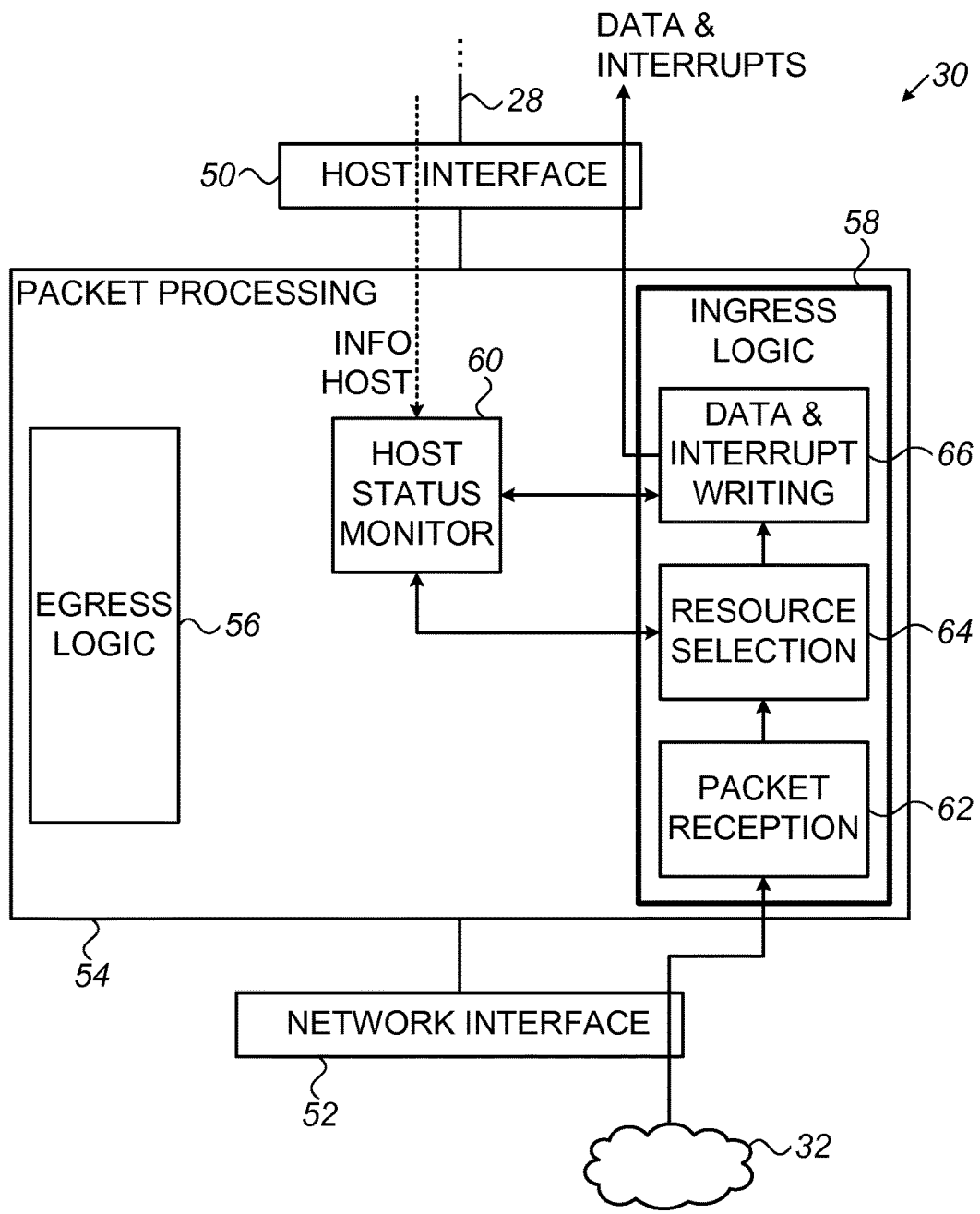
FIG. 2 is a block diagram that schematically shows elements of a network interface controller (NIC), in accordance with an embodiment of the invention.

FIG. 2 is a block diagram that schematically shows details of NIC 30, in accordance with an embodiment of the invention. NIC 30 is connected to bus 28 by a host interface 50, such as a PCIe interface, and to network 32 by a network interface 52, such as an InfiniBand or Ethernet interface with one or more ports. Packet processing circuitry 54 is coupled between host interface 50 and network interface 52 and includes egress logic 56, for generating and transmitting outgoing packets to network 32, and ingress logic 58, for receiving packets from network 32 and delivering the packet contents to the appropriate processes running on CPU 22. For the sake of brevity, the present disclosure will focus only certain functions of ingress logic 58, and specifically how these functions are controlled so as to optimize power consumption by the host resources based on the power state information provided by CPU 22. The integration of these power-related functions with the general design and functionality of egress logic 56 and ingress logic 58 of existing NICs will be apparent to those skilled in the art after reading the present description.

In the pictured embodiment, host status monitor 60 within NIC 30 (typically as a part of packet processing circuitry 54)

receives and stores information from the power monitoring component associated with CPU 22 regarding respective power states of the host resources, such as cores 38, as well as root complex 24 and memory. Ingress logic 58 uses this power state information in selectively directing data from the network to the appropriate host resources. Specifically, upon receiving a packet from network 32, packet reception logic 62 processes the packet header in order to identify the QP 40 to which the packet belongs and thus to identify the process on CPU 22 to which the data payload of the packet is to be delivered. Resource selection logic 64 identifies the host resources to be used in the delivering the data, based on information provided by status monitor 60. Considerations applied by logic 64 in this regard have been described above, and further details are presented hereinbelow with reference to FIG. 3.

In an alternative embodiment, not shown explicitly in the figures, the functions of host status monitor 60 and resource selection logic 64 are implemented in driver software running on CPU 22. On the basis of these functions, the driver software generates and transfers to packet processing circuitry 54 power state information in the form of interrupt and data steering instructions.

In either case, based on the resource selection made by logic 64 (whether implemented in packet processing circuitry 54 or in driver software), a scatter engine 66 in ingress logic 58 writes the data to an appropriate buffer in memory 42 and sends an interrupt over bus 28 to the core 38 that is to receive and process the data. The decisions of scatter engine 66 regarding data delivery and interrupt moderation are likewise affected by power state information provided by monitor 60, specifically depending upon whether the resources selected to receive the data are currently active or in a sleep state.

Figure 3:
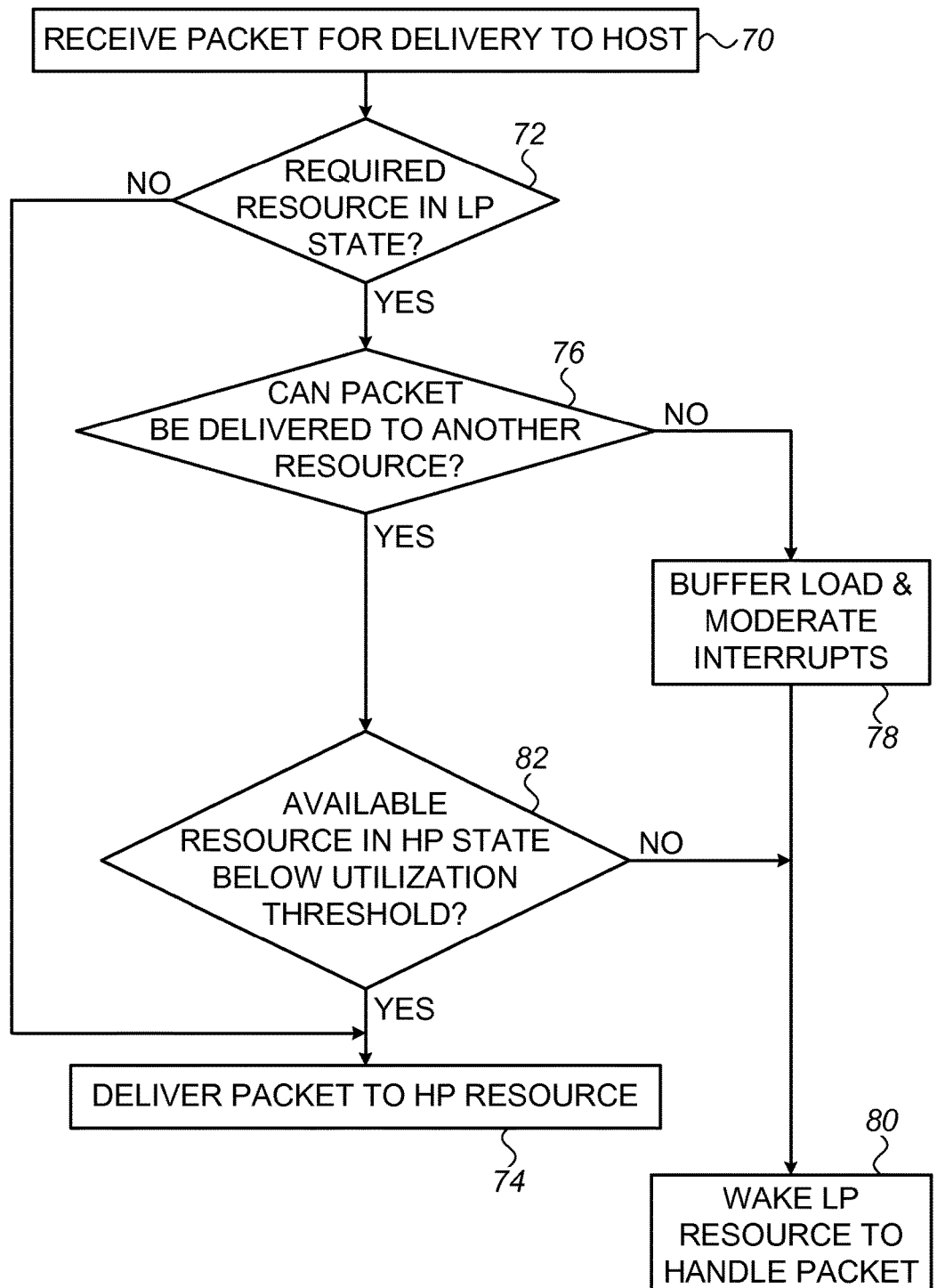
FIG. 3 is a flow chart that schematically illustrates a method for handling of incoming packets by a NIC, in accordance with an embodiment of the invention.

FIG. 3 is a flow chart that schematically illustrates a method for handling of incoming packets from network 32 by NIC 30, in accordance with an embodiment of the invention. The method uses power state information regarding host resources, which is received and stored asynchronously by host status monitor 60, as noted above. The method is typically initiated each time ingress logic 58 receives a data packet from network 32 for delivery to a process on CPU 22, at a packet input step 70. Packet reception logic 62 identifies the QP 40 of the packet, and thus the target process to which the packet is directed.

Resource selection logic 64 uses the identification of the target process, along with information provided by monitor 60, in determining whether the resources required in order to receive the packet are in a high-power (HP), active state, or in a low-power (LP), sleeping state, at a resource evaluation step 72. For example, monitor 60 may indicate that the target process is currently running on one of cores 38 that are active. In this case, resource selection logic instructs scatter engine 66 to deliver the packet to the appropriate, active core, at a packet delivery step 74. Typically, the scatter engine will issue an interrupt to notify the core in question.

On the other hand, if a resource or resources required for the target process are currently in a low-power state (for example, if the core 38 to which the target process is assigned is currently sleeping), resource selection logic 64 assesses whether another resource, such as a core that is currently active, can be used in receiving the packet, at an alternative resource assessment step 76. If not, it will be necessary to awaken and power up the target resource, such as one of cores 38 that is currently sleeping. In this case, scatter engine 66 typically holds the data load in an appropriate buffer 42 and moderates issuance of an interrupt to the designated core, at a buffering step 78. The data may be buffered and the interrupt moderated for only a minimal time, as required to wake the sleeping core, or the moderation and buffering time may be extended as part of a strategy for reducing power consumption. In either case, at the appropriate time, scatter engine 66 issues an interrupt to the designated core, which wakes and handles the packet, at a resource activation step 80.

In most cases, however, it will be possible at step 76 for resource selection logic 64 to choose other host resources that are currently active in order to handle the incoming packet. For this purpose, logic 64 receives information from monitor 60, indicating which host resources are in high-power (active) states, such as which of cores 38 are active, as well as the current utilization measures of the active cores. Resource selection logic 64 checks the utilization measures against a predefined threshold and attempts to select an active core whose utilization level is still below the threshold, at a resource identification step 82. Upon identifying an appropriate active core, logic 64 instructs scatter engine 66 to deliver the data packet and send an interrupt to notify the selected core at step 74.

Typically, at step 82, logic 64 will choose the core having the highest utilization measure that is below the threshold. This strategy will tend to concentrate workload in one or a few active cores, while allowing other cores to drop off to a sleep state when possible. Logic 64 may also distribute the workload in such a way as to cause active cores, when necessary, to increase their respective clock frequencies and/or performance levels.

On the other hand, if the utilization measures of all the active cores are above the threshold, resource selection logic 64 will determine at step 82 that a sleeping core must be activated in order to handle the current packet. In this case, logic 64 will choose the core to awaken, and will instruct scatter engine 66 to issue an interrupt to the designated core at step 80. Host status monitor 60 in this case may receive and provide logic 64 with information not only as to which cores 38 are asleep, but also regarding the respective sleep levels, so that logic 64 can select a core to awaken that is in a relatively "light" state of sleep.

As noted earlier, although the above embodiments relate specifically, for the sake of concreteness and clarity, to handling of incoming packets by NIC 30, the principles of the present invention may also be applied in optimizing power consumption by host resources in connection with other functions of the NIC, as well as in operation of other sorts of peripheral devices. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing data, comprising:
   collecting in a peripheral device, which is connected by a bus to a host processor having multiple host resources, information regarding respective power states of the multiple host resources and utilization levels of host resources that are active;
   receiving, by the peripheral device, items of data;
   choosing, in the peripheral device, host resources to handle the received items of data, responsively to the information regarding the respective power states and the utilization levels, collected by the peripheral device; and directing data from the peripheral device to the host resources chosen responsively to the respective power states and utilization levels.

2. The method according to claim 1, wherein the multiple host resources comprise multiple processing cores, and wherein selectively directing the data comprises selectively directing data to the cores based on the respective power states of the cores.

3. The method according to claim 2, wherein the information identifies one or more first cores that are in an active state, while one or more second cores are in a sleep state, and wherein choosing the core comprises preferentially selecting one of the first cores and directing the item of the data to the selected one of the first cores.

4. The method according to claim 3, wherein choosing the core comprises selecting one of the first cores having a respective measure of utilization that is below a predefined threshold for direction of the item of the data thereto, and selecting one of the second cores for direction of the item of the data thereto when the respective measures of utilization of all of the first cores are above the predefined threshold.

5. The method according to claim 3, wherein the information is indicative of a service level provided by the first cores.

6. The method according claim 3, wherein the information is indicative of different, respective sleep levels of the second cores, and wherein choosing the core comprises, when not selecting one of the first cores, selecting one of the second cores for direction of the item of the data thereto responsively to the respective sleep levels.

7. The method according to claim 2, wherein the information collected by the peripheral device is indicative of respective clock frequencies of one or more of the processing cores, and wherein choosing the core comprises selecting the core by the peripheral device for direction of the item of the data thereto responsively to the clock frequencies.

8. The method according to claim 1, wherein the multiple host resources comprise multiple processing cores, and wherein selectively directing the data comprises choosing a core for direction of an item of the data thereto from the peripheral device, and moderating issuance of an interrupt to inform the chosen core of delivery of the item of the data based on a respective power state of the chosen core.

9. The method according to claim 1, wherein selectively directing the data comprises selectively buffering a portion of the data responsively to the respective power states of the host resources to which the data are directed.

10. The method according to claim 1, wherein the peripheral device comprises a network interface controller (NIC), and wherein selectively directing the data comprises receiving in the NIC data packets from a network, and choosing the host resources to be applied in handling the data packets responsively to the respective power states.

11. The method according to claim 1, wherein collecting the information comprises receiving, in the peripheral device, steering instructions provided by software running on the host processor based on the power states of the host resources.

12. The method according to claim 1, wherein selectively directing the data comprises holding off directing one or more data items to their respective chosen host resources responsively to the respective power states.

13. The method according to claim 1, wherein choosing the host resources comprises choosing a host resource for a received data packet responsively to a target process to which the data packet is directed and to the respective power states.

14. The method according to claim 1, wherein collecting the information in the peripheral device comprises receiving the information regarding the respective power states in packets passing in-band on the bus.

15. The method according to claim 10, wherein choosing the host resources to be applied in handling the data packets comprises choosing, by the peripheral device, host resources to be applied in handling a data packet responsively to the respective power states and a header of the data packet.

16. Apparatus for processing data, comprising:
a host interface, which is configured to be connected by a bus to a host processor having multiple host resources;
a network interface, which is configured to transmit and receive data over a network; and
packet processing circuitry, which is coupled between the host interface and the network interface, and is configured to collect information regarding respective power states of the multiple host resources and utilization levels of host resources that are active, to receive items of data through the network interface, to choose host resources to handle the received items of data, responsively to the collected information regarding the respective power states and the utilization levels of the host resources and to selectively direct the data from the network to the host resources chosen responsively to the respective power states and utilization levels.

17. The apparatus according to claim 16, wherein the multiple host resources comprise multiple processing cores, and wherein the packet processing circuitry is configured to choose a core for direction of an item of the data thereto via the host interface based on the respective power states of the cores.

18. The apparatus according to claim 17, wherein the information identifies one or more first cores that are in an active state and one or more second cores that are in a sleep state, and wherein the packet processing circuitry is configured to preferentially select one of the first cores and to direct the item of the data to the selected one of the first cores.

19. The apparatus according to claim 18, wherein the packet processing circuitry is configured to select one of the first cores having a respective measure of utilization that is below a predefined threshold for direction of the item of the data thereto, and to select one of the second cores for direction of the item of the data thereto when the respective measures of utilization of all of the first cores are above the predefined threshold.

20. The apparatus according to claim 18, wherein the information is indicative of a service level provided by the first cores.

21. The apparatus according claim 18, wherein the information is indicative of different, respective sleep levels of the second cores, and wherein the packet processing circuitry is configured, when not selecting one of the first cores, to select one of the second cores for direction of the item of the data thereto responsively to the respective sleep levels.

22. The apparatus according to claim 17, wherein the information is indicative of respective clock frequencies of one or more of the processing cores, and wherein the packet processing circuitry is configured to select the core for direction of the item of the data thereto responsively to the clock frequencies.

23. The apparatus according to claim 16, wherein the multiple host resources comprise multiple processing cores, and wherein the packet processing circuitry is configured to choose a core for direction of an item of the data thereto via the host interface, and to moderate issuance of an interrupt to inform the chosen core of delivery of the item of the data based on a respective power state of the chosen core.

24. The apparatus according to claim 16, wherein the packet processing circuitry is configured to selectively buffer a portion of the data responsively to the respective power states of the host resources to which the data are directed.

25. The apparatus according to claim 16, wherein the packet processing circuitry is configured to choose host resources to handle the received items of data, responsively to the collected information regarding the respective power states and to respective headers of the items of data.

26. A computing system, comprising:
   a host processor, which comprises host resources including multiple processing cores, and a memory;
   a bus coupled to the host processor; and
   a peripheral device, which is coupled to the bus and is configured to receive, from the host processor, information regarding respective power states of the multiple host resources and utilization levels of host resources that are active, to receive items of data through a network interface, to choose host resources to handle the received items of data, responsively to the respective power states and the utilization levels of the host resources and to direct data to the host resources chosen responsively to the respective power states and utilization levels.

27. The system according to claim 26, wherein the peripheral device comprises a network interface controller (NIC), which is configured to receive data packets from a network, and to choose the host resources to be applied in handling the data packets responsively to the respective power states.

28. The system according to claim 26, wherein the information comprises steering instructions provided to the peripheral device by software running on the host processor based on the power states of the host resources.

* * * * *